United States Patent
Sugita et al.

(10) Patent No.: US 9,128,294 B2
(45) Date of Patent: Sep. 8, 2015

(54) DISPLAY DEVICE COMPRISING A LIQUID CRYSTAL LENS PANEL WHEREIN LIQUID CRYSTAL MATERIAL IS DRIVEN IN A TWISTED NEMATIC MODE ON STRIPE ELECTRODES

(71) Applicant: Japan Display Inc., Tokyo (JP)

(72) Inventors: Tatsuya Sugita, Tokyo (JP); Tomohiko Naganuma, Tokyo (JP); Shinichiro Oka, Tokyo (JP); Toshio Miyazawa, Tokyo (JP); Terunori Saitou, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 28 days.

(21) Appl. No.: 14/203,824

(22) Filed: Mar. 11, 2014

(65) Prior Publication Data

US 2014/0267958 A1   Sep. 18, 2014

(30) Foreign Application Priority Data

Mar. 12, 2013   (JP) .................................. 2013-049077

(51) Int. Cl.
| | |
|---|---|
| G02F 1/1335 | (2006.01) |
| G02F 1/13 | (2006.01) |
| G02B 27/22 | (2006.01) |
| G02F 1/1347 | (2006.01) |
| G02F 1/139 | (2006.01) |
| G02F 1/1339 | (2006.01) |
| G02F 1/1343 | (2006.01) |

(52) U.S. Cl.
CPC .......... *G02B 27/2214* (2013.01); *G02F 1/1393* (2013.01); *G02F 1/13471* (2013.01); *G02F 1/13394* (2013.01); *G02F 2001/134381* (2013.01); *G02F 2201/128* (2013.01)

(58) Field of Classification Search
CPC ................. G02F 1/13471; G02F 2001/134381
USPC ............................ 349/15, 101, 179, 180, 200
See application file for complete search history.

(56) References Cited

U.S. PATENT DOCUMENTS

| | | | |
|---|---|---|---|
| 2009/0015732 A1* | 1/2009 | Yabuta et al. ...................... | 349/1 |
| 2009/0102990 A1* | 4/2009 | Walton et al. ................... | 349/15 |
| 2010/0238276 A1 | 9/2010 | Takagi et al. | |
| 2011/0043715 A1* | 2/2011 | Ohyama et al. ................. | 349/15 |
| 2012/0120331 A1* | 5/2012 | Oka et al. ......................... | 349/15 |

FOREIGN PATENT DOCUMENTS

JP   2010-224191   10/2010

* cited by examiner

*Primary Examiner* — Paul Lee
(74) *Attorney, Agent, or Firm* — Lowe Hauptman & Ham, LLP

(57) ABSTRACT

A liquid crystal material is driven in a twisted nematic mode so that while liquid crystal molecules lose, on a stripe electrode, rotary power toward a direction along an electric field by a voltage applied between the stripe electrode and a second electrode and form, in a region between the adjacent stripe electrodes, refractive index distribution of a lenticular lens that includes a cylindrical lens in which a cylindrical axis is arranged in a first direction. The cylindrical lens faces at least two rows of pixels, and has an effective refractive index for causing light from the at least two rows of pixels to advance in separating directions from each other after emission from a second polarizing plate. A distance d of a cell gap and an interval s between the adjacent stripe electrodes satisfy the relation of $3.5 \leq s/d \leq 7$.

11 Claims, 15 Drawing Sheets

FIG.11
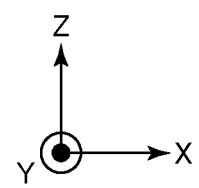
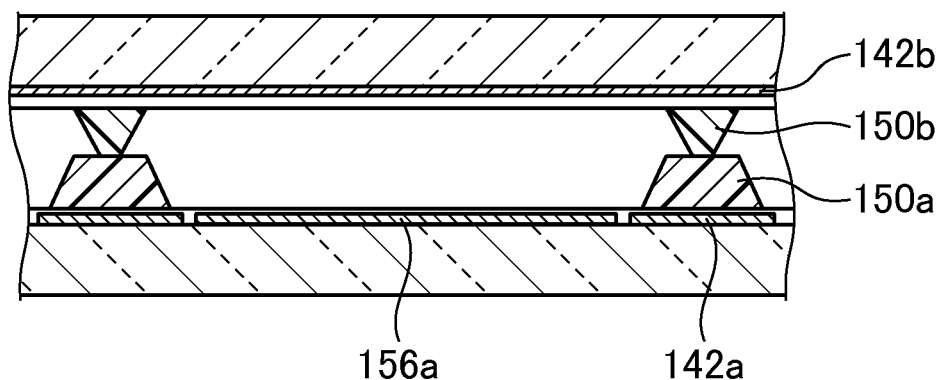

2000

DISPLAY DEVICE COMPRISING A LIQUID CRYSTAL LENS PANEL WHEREIN LIQUID CRYSTAL MATERIAL IS DRIVEN IN A TWISTED NEMATIC MODE ON STRIPE ELECTRODES

CROSS-REFERENCE TO RELATED APPLICATION

The present application claims priority from Japanese application JP2013-49077 filed on Mar. 12, 2013, the content of which is hereby incorporated by reference into this application.

BACKGROUND OF THE INVENTION

1. Field of the Invention

The present invention relates to a display device.

2. Description of the Related Art

As a naked-eye stereoscopic display in which a two-dimensional display and a three-dimensional display are switched, a liquid crystal lens type has been proposed (JP 2010-224191A). The liquid crystal lens type that uses refractive index distribution generated by orientation distribution of liquid crystal has a characteristic of a high transmittance in the three-dimensional display compared with a liquid crystal barrier type.

A stereoscopic image is stereoscopically viewed by displaying a left-eye image only to the left eye and displaying a right-eye image only to the right eye. However, if the left-eye image inappropriately reaches the right eye or the right-eye image inappropriately reaches the left eye, crosstalk (double image) occurs, in which the stereoscopic view is not provided. In the liquid crystal lens type, the crosstalk easily occurs compared with the liquid crystal barrier type. Further, in order for liquid crystal cells to function as a lens, a cell gap is significantly wide (about 30 µm), which lengthens a response time. Furthermore, a columnar spacer is provided at the center of the lens so as not to influence the performance of the lens, which causes a problem that the columnar spacer is easily viewed particularly in the three-dimensional display.

SUMMARY OF THE INVENTION

The invention is to provide a technique capable of reducing crosstalk and a response time, and preventing a spacer from being easily viewed.

(1) According to an aspect of the invention, there is provided a display device including: a display panel that displays an image formed by a plurality of pixels; a liquid crystal lens panel for a naked-eye stereoscopic view; and a plurality of spacers, in which the liquid crystal lens panel includes a first substrate, a second substrate, a liquid crystal material disposed in a cell gap between the first substrate and the second substrate, a first electrode formed on a first inner surface of the first substrate that faces the liquid crystal material, a second electrode formed on a second inner surface of the second substrate that faces the liquid crystal material, a first polarizing plate arranged on a side of the first substrate opposite to the liquid crystal material, and a second polarizing plate arranged on a side of the second substrate opposite to the liquid crystal material, the first polarizing plate and the second polarizing plate are arranged in a crossed-Nicol manner, the liquid crystal material is arranged in a state where orientation of liquid crystal molecules is twisted so that incident light that passes through the first polarizing plate and is polarized passes through the second polarizing plate while being rotated, one of the first electrode and the second electrode includes a plurality of stripe electrodes that extend in a first direction and are arranged at intervals in a second direction intersecting with the first direction so that the adjacent stripe electrodes are arranged in parallel, the other one of the first electrode and the second electrode is arranged to face the plurality of stripe electrodes, the liquid crystal material is driven in a twisted nematic mode in which, while the liquid crystal molecules lose on each of the stripe electrodes, rotary power toward a direction along an electric field by a voltage applied between the plurality of stripe electrodes and the second electrode, the plurality of pixels are arranged in a plurality of rows so that each row extends along the first direction, and the plurality of spacers are arranged on the plurality of stripe electrodes to maintain the cell gap. According to this aspect of the invention, when the liquid crystal lens panel is not driven, since the polarized light that is incident onto the liquid crystal material through the first polarizing plate is rotated in the liquid crystal material and passes through the second polarizing plate, a two-dimensional display can be achieved. In a three-dimensional display, since the liquid crystal molecules lose rotary power on the stripe electrodes, the light becomes dark without passage on the stripe electrodes. Thus, even though the width of the stripe electrodes is increased, it is possible to reduce a crosstalk component. Since it is possible to increase the width of the stripe electrodes, it is possible to reduce the interval between the adjacent stripe electrodes. Accordingly, it is possible to reduce the cell gap. As the cell gap is reduced, it is possible to decrease a response time of the liquid crystal lens panel.

(2) In the display device according to (1), the plurality of spacers may be arranged so as not to be protruded on the plurality of stripe electrodes.

(3) In the display device according to (2), a distance d of the cell gap and the interval s between the adjacent stripe electrodes may satisfy the relation of $3.5 \leq s/d \leq 7$. The present inventors found that when the distance d of the cell gap and the interval s between the adjacent stripe electrodes satisfy the relation of $3.5 \leq s/d \leq 7$, it is possible to reduce crosstalk.

(4) In the display device according to (3), a pitch $P_2$ of the adjacent spacers in the second direction and a pitch Q of the adjacent stripe electrodes may satisfy the relation of $P_2 = nQ$ (n is a natural number).

(5) In the display device according to (4), a pitch $P_1$ of the adjacent spacers in the first direction and the pitch Q of the adjacent stripe electrodes may satisfy the relation of $P_1 = mQ$ (m is a natural number).

(6) In the display device according to any one of (1) to (5), the liquid crystal lens panel may further include a first orientation film formed on the first inner surface of the first substrate to cover the first electrode, and a second orientation film formed on the second inner surface of the second substrate to cover the second electrode.

(7) In the display device according to (6), an angle formed by a rubbing direction of the first orientation film and a rubbing direction of the second orientation film may be 90 degrees.

(8) In the display device according to (6) or (7), a permissible value of a transmission axis of the first polarizing plate may be 80 to 90 degrees, and the rubbing direction of the first orientation film may be 80 to 90 degrees with respect to the first direction.

(9) In the display device according to any one of (1) to (8), the width of each of the stripe electrodes may be wider than the thickness of the liquid crystal material.

(10) In the display device according to anyone of (1) to (9), the plurality of stripe electrodes may be a plurality of first stripe electrodes included in the first electrode, the second electrode may include a plurality of second stripe electrodes, each of the spacers may include a first spacer and a second spacer that are arranged to be overlapped, the first spacer may be arranged on the first stripe electrode, the second spacer may be arranged on the second stripe electrode, a cross section of the first spacer may be a rectangular shape, in which short sides thereof are parallel to the first stripe electrode, a cross section of the second spacer may be a rectangular shape, which is a shape obtained by rotating the first spacer by 90 degrees, and the first spacer and the second spacer may overlap each other in a cross shape.

(11) The display device according to (10) may further include: a first auxiliary electrode provided between the adjacent first stripe electrodes, and a second auxiliary electrode provided between the adjacent second stripe electrodes.

BRIEF DESCRIPTION OF THE DRAWINGS

FIG. 11 is a cross-sectional view, taken along line XI-XI, illustrating the structure shown in FIG. 10.

DETAILED DESCRIPTION OF THE INVENTION

Hereinafter, embodiments of the invention will be described with reference to the accompanying drawings.

Figure 1:
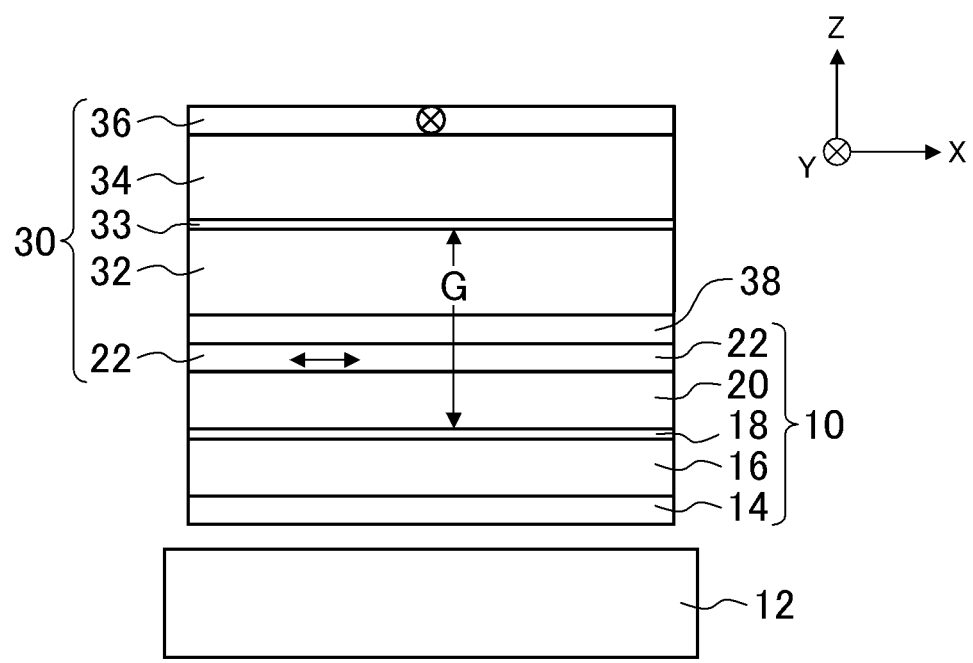
FIG. 1 is a cross-sectional view illustrating an outline of a display device according to an embodiment of the invention.

FIG. 1 is a cross-sectional view illustrating an outline of a display device according to an embodiment of the invention. The display device includes a display panel 10. The display panel 10 displays an image. If the display panel 10 is a liquid crystal display panel, its display mode may be an in place switching (IPS) mode, or may be another display mode. The display panel 10 includes a lower polarizing plate 14, a thin film transistor (TFT) substrate 16, a liquid crystal material 18, a color filter substrate 20, and a first polarizing plate 22 in a laminating order from the side of a backlight 12.

Figure 2:
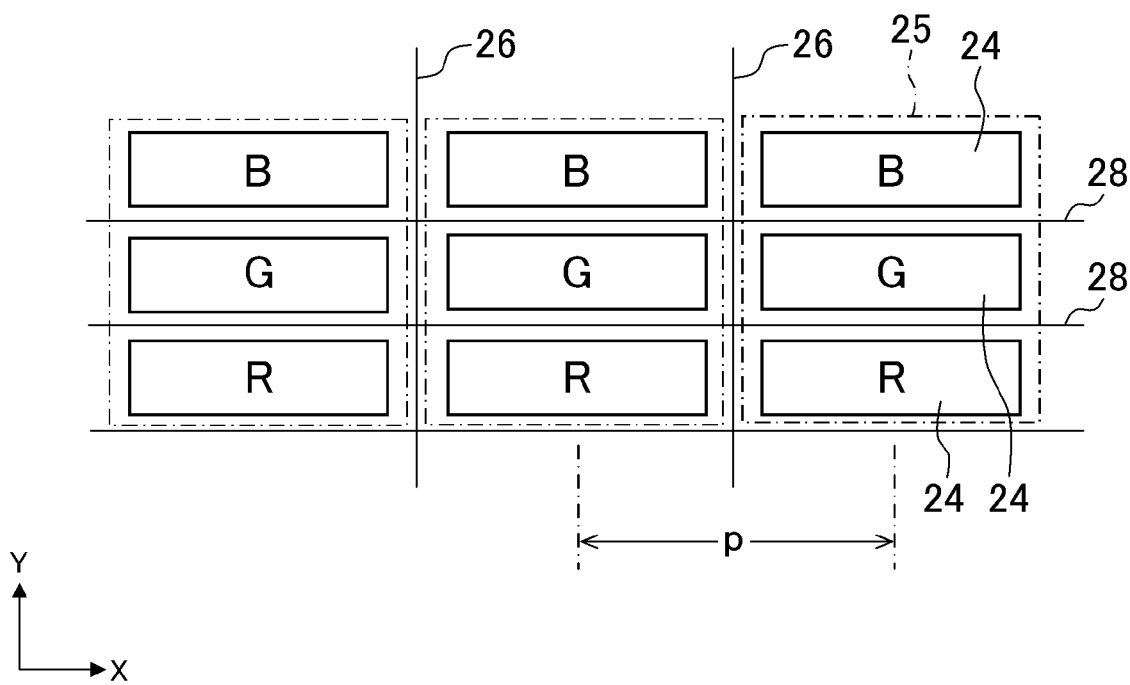
FIG. 2 is an enlarged plan view illustrating a part of a screen of a display panel where an image is displayed.

FIG. 2 is an enlarged plan view illustrating a part of a screen of the display panel 10 where an image is displayed. The image displayed by the display panel 10 is formed by plural pixels 24. The plural pixels 24 are arranged in plural rows so that each row extends along a first direction (Y direction in FIG. 2). Rectangular areas surrounded by drain lines 26 and gate lines 28 correspond to color filters of red (R), green (G) and blue (B). Each of the plural pixels 24 is a subpixel of any color of R, G and B. Full color pixels 25 that respectively include three pixels, that is, the R, G and B pixels 24 (subpixels), are arranged in a matrix form in a display area. The plural pixels 24 are arranged in parallel in the Y direction, but the arrangement of the pixels 24 is not limited thereto. For example, the plural pixels 24 may be arranged in parallel in an X direction.

As shown in FIG. 1, the display device includes a liquid crystal lens panel 30 for naked-eye stereoscopic view. The liquid crystal lens panel 30 includes the first polarizing plate 22, a first substrate 32, a liquid crystal material 33, a second substrate 34 and a second polarizing plate 36 in a laminating order from the side of the backlight 12. The first polarizing plate 22 is shared by the display panel 10 and the liquid crystal lens panel 30. The first polarizing plate 22 that serves as a part of the display panel 10 and the first substrate 32 that serves as a part of the liquid crystal lens panel 30 are bonded to each other by an adhesive resin 38. A permissible value of a transmission axis of the first polarizing plate 22 is 80 to 90 degrees.

Figure 3:
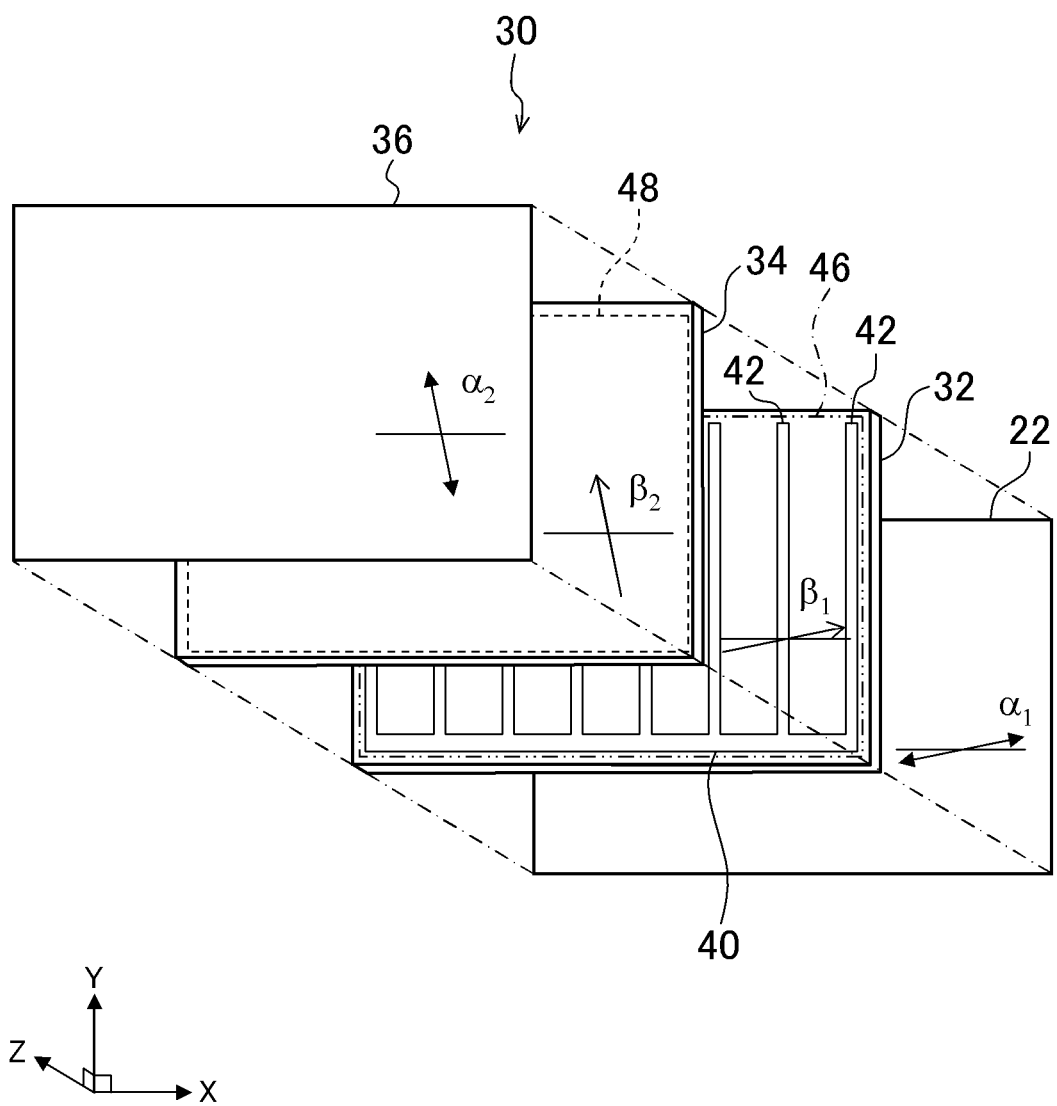
FIG. 3 is an exploded perspective view illustrating a main part of a liquid crystal lens panel.
Figure 4:
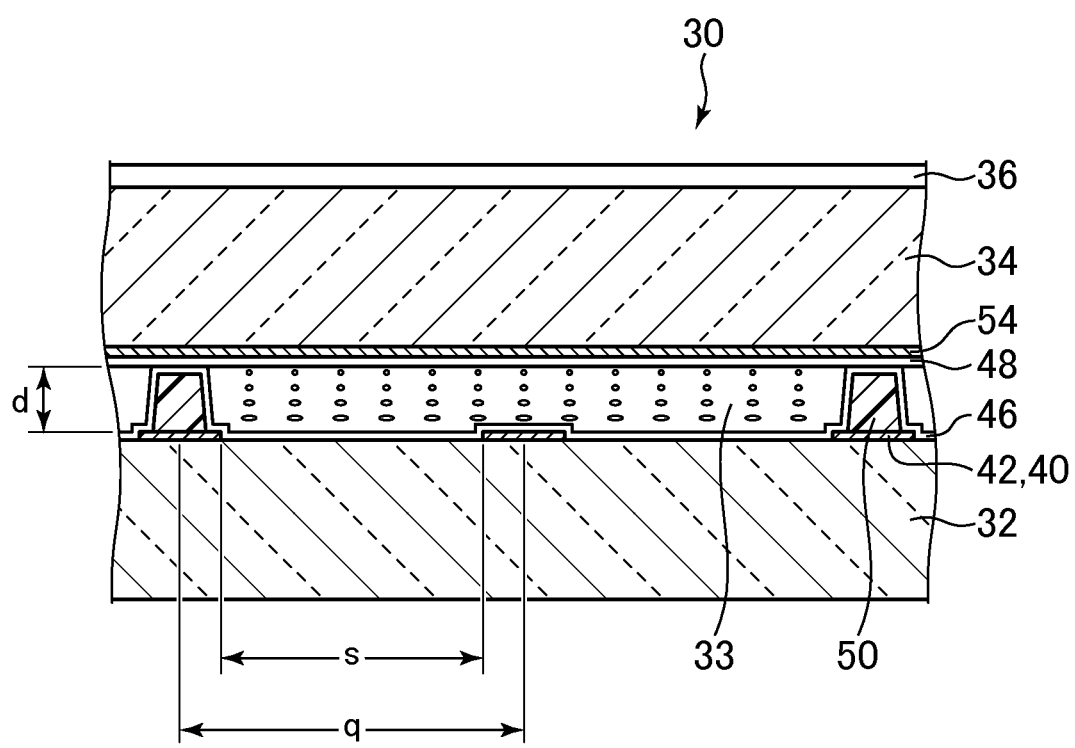
FIG. 4 is a cross-sectional view illustrating the liquid crystal lens panel.

FIG. 3 is an exploded perspective view illustrating a main part of the liquid crystal lens panel 30. FIG. 4 is a cross-sectional view illustrating the liquid crystal lens panel 30. The liquid crystal lens panel 30 includes the first substrate 32. On an inner surface of the first substrate 32 that faces the liquid crystal material 33, a first electrode 40 formed of a transparent conductive material such as indium tin oxide (ITO) is provided. The first electrode 40 is patterned in a comb teeth shape, and includes plural stripe electrodes 42. The stripe electrodes 42 extend in the first direction (Y direction), respectively. The stripe electrodes 42 are arranged at intervals in a second direction (X direction) intersecting with the first direction so that the adjacent stripe electrodes are arranged in parallel. On a side of the first substrate 32 opposite to the liquid crystal material 33, the first polarizing plate 22 is disposed. An incident polarization direction (polarization direction of light that passes through the first polarizing plate 22) to the liquid crystal lens panel 30 from the display panel 10 forms an angle of 80 to 90 degrees with respect to the stripe electrodes 42 of the first electrode 40.

On the inner surface of the first substrate 32, a first orientation film 46 is formed to cover the first electrode 40. The first orientation film 46 is rubbed so that liquid crystal molecules are orientated approximately in parallel to the incident polarization direction. A rubbing angle is 80 to 90 degrees with respect to the stripe electrodes 42 of the first electrode 40. That is, a rubbing direction of the first orientation film 46 is 80 to 90 degrees with respect to the first direction (Y direction).

The incident polarization direction to the liquid crystal lens panel 30 (transmission axis direction of the first polarizing plate 22) forms an angle of 0 to 10 degrees with respect to a long side of the liquid crystal lens panel 30 (X direction). If the incident polarizing direction to the liquid crystal lens panel 30 coincides with linear polarization in a desired direction, the display mode of the display panel 10 is not limited. If the polarization direction is different from the linear polarization in the desired direction, a phase difference member may be provided between the first polarizing plate 22 and the liquid crystal material 33 so that the polarization direction coincides with the linear polarization in the desired direction.

The relation of angles between a transmission axis of the first polarizing plate 22 and the second polarizing plate 36 and orientation directions of the first orientation film 46 and a second orientation film 48 will be described with reference to FIG. 3. As axis angles relating to characteristics of a liquid crystal lens, a transmission axis angle $\alpha 1$ of the first polarizing plate 22, a rubbing angle $\beta 1$ of the first orientation film 46, a rubbing angle $\beta 2$ of the second orientation film 48 and a transmission axis angle $\alpha 2$ of the second polarizing plate 36 are used. The angles represent angles with respect to the X direction (direction perpendicular to the length of the stripe electrode 42).

When the display panel 10 is in the IPS mode of a mono-domain, the transmission axis angle $\alpha 1$ is preferably 1 to 10 degrees, and more preferably 3 to 8 degrees.

If the rubbing angle $\beta 1$ is equal to the transmission axis angle $\alpha 1$, even though linearly polarized light that passes through the first polarizing plate 22 is incident onto the liquid crystal material 33, the linearly polarized light does not become elliptically polarized light, and is incident onto the liquid crystal material 33 as the linearly polarized light is. Thus, it is preferable that the rubbing angle $\beta 1$ matches with the transmission axis angle $\alpha 1$, which is preferably 1 to 10 degrees, and more preferably 3 to 8 degrees. Here, since the convergency of the liquid crystal lens is superior as the rubbing angle $\beta 1$ becomes smaller, the rubbing angle $\beta 1$ may be set to 0 degree.

The rubbing angle $\beta 2$ is expressed as $\beta 2 = \beta 1 + \gamma (\neq 0)$, twisted nematic orientation is applied to the liquid crystal material 33. That is, since the rubbing angle $\beta 1$ is different from the rubbing angle $\beta 2$, the liquid crystal material 33 is twisted. The incident light is optically rotated along a twist angle, and a polarization plane of the linearly polarized light advances while being rotated.

To reduce crosstalk in the three-dimensional display, $\gamma = 90°$ is preferably used.

If the transmission axis angle $\alpha 2$ is equal to the rubbing angle $\beta 2$, it is possible to maximize the intensity of light passing through the second polarizing plate 36, which is preferable. That is, it is more preferable that $\alpha 1 = \beta 2$ and $\beta 2 = \alpha 2 = \beta 1 + 90°$.

If the transmission axis angle $\alpha 2$ is set to 70 to 90 degrees, it is possible to view a bright three-dimensional image and a bright two-dimensional image even using polarizing sunglasses. If the transmission axis angle $\alpha 2$ is set to about 30 to about 60 degrees, and preferably 45 degrees, it is possible to view a display even using the polarizing sunglasses, and to view an image using the polarizing sunglasses even when the display is rotated by 90 degrees to be vertical.

If the display panel 10 is in the IPS mode of the multi-domain, the transmission axis angle $\alpha 1$ is set to 0 degree. It is preferable that the rubbing angle $\beta 1$ be equal to the transmission axis angle $\alpha 1$, that is, $\beta 1$ be 0 degree. Here, the rubbing angle $\beta 1$ may be set to 1 to 10 degrees, or 1 to 3 degrees. By setting $\beta 2 = \alpha 2$, it is possible to maximize the intensity of light passing through the second polarizing plate 36. Accordingly, it is more preferable that $\alpha 1 = \beta 1 = 0°$ and $\beta 2 = \alpha 2 = 90°$. Here, to view the image even using the polarizing sunglasses, $\beta 2 = \beta 1 + \gamma$ and $30° \leq \gamma \leq 60°$ may be used.

In the following description, the case of $\alpha 1 = \beta 1 = 0°$ and $\beta 2 = \alpha 2 = 90°$ will be described.

Figure 5:
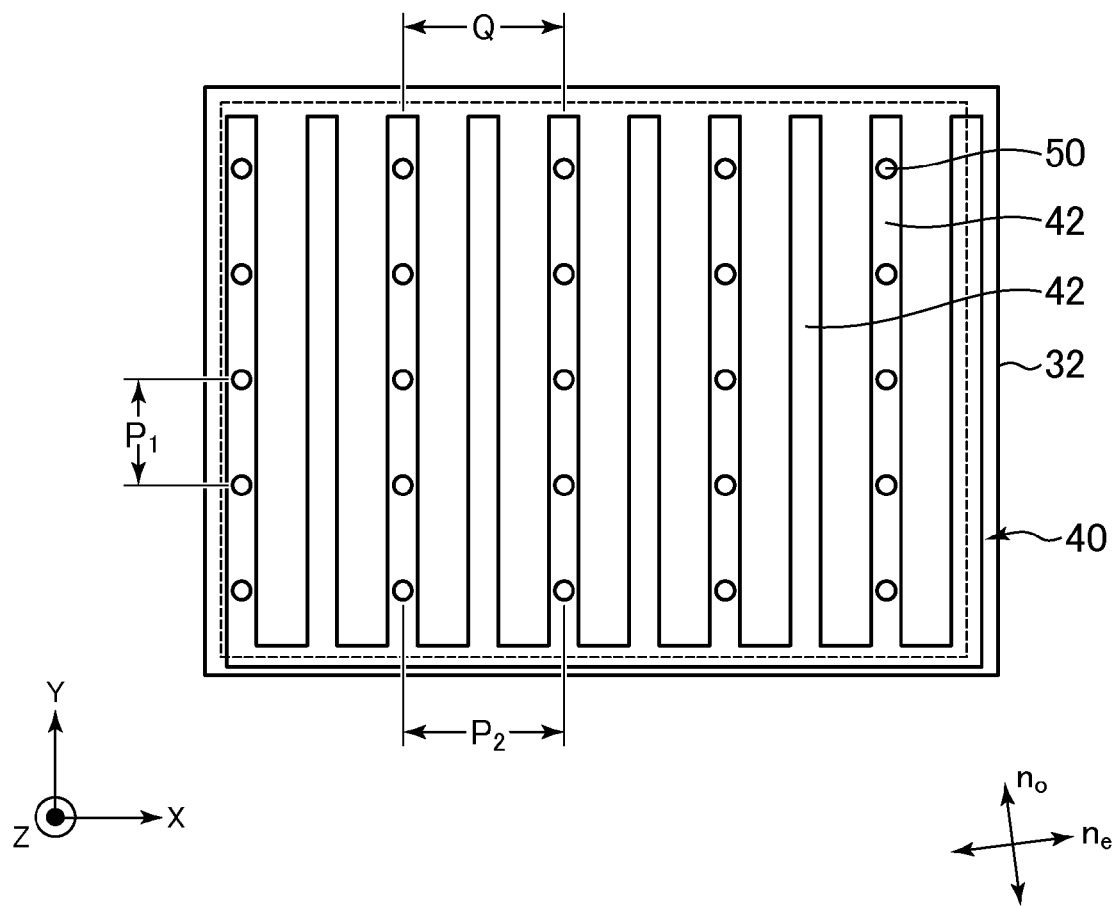
FIG. 5 is a plan view illustrating a stripe electrode.

FIG. 5 is a plan view illustrating the stripe electrodes 42. On the plural stripe electrodes 42, plural spacers 50 for maintaining a cell gap are arranged so as not to be protruded therethrough. The spacers 50 are formed so that the maximum width thereof is smaller than the width of the stripe electrodes 42 so as not to be protruded from the stripe electrodes 42.

With this configuration, the spacers 50 are not easily viewed in the three-dimensional display. The less the spacers 50 are viewed in the three-dimensional display as the larger the ratio of the height to the width (aspect ratio) is, which is preferable. However, if the aspect ratio is large, it is difficult to form the spacers 50, and the strength is reduced. Thus, it is necessary to increase the arrangement density of the spacers 50. Thus, the ratio of the width and the height of the spacers 50 is set to 1:1. The width of the stripe electrodes 42 is preferably larger than the cell gap.

The spacers 50 are formed in a columnar shape, and are arranged between the first substrate 32 and the second substrate 34. A cross section (cross section orthogonal to a height direction) of the spacers 50 may be a circle or a quadrangle. Each spacer 50 stands up straight so that change in the shape of the cross section is small from the bottom to the top and a wall surface thereof is approximately vertical, which is preferable in view of reducing light scattering.

A pitch $P_1$ of the adjacent spacers 50 in the first direction (Y direction) and a pitch Q of the adjacent stripe electrodes 42 satisfy the relation of $P_1 = mQ$ (m is a natural number).

A pitch $P_2$ of the adjacent spacers 50 in the second direction (X direction) and the pitch Q of the adjacent stripe electrodes 42 satisfy the relation of $P_2 = nQ$ (n is a natural number).

The spacers 50 may be formed by photolithography using an ultraviolet curing resin, or may be formed by screen-printing, ink jet printing or the like. A transparent material is preferably used for the spacers 50, but the spacers 50 may be colored in black. The spacers 50 are arranged with a small density in a range where the strength capable of maintaining the cell gap is obtained.

The spacers 50 are preferably formed on the first substrate 32 on which the stripe electrodes 42 are formed so that the spacers 50 can be positioned to match with the stripe electrodes 42 in formation, but may be formed on the second substrate 34. When the spacers 50 are formed on the second substrate 34, the rubbing direction of the second orientation film 48 becomes approximately parallel to the extending direction of the stripe electrodes 42 of the first substrate 32, and a rubbing error due to the spacers 50 occurs in the length direction of the stripe electrodes 42, to thereby achieve an effect that the stripe electrodes 42 in the three-dimensional display hide the rubbing error portion to be hardly viewed.

As a modification example, the plural spacers may be arranged in irregular pitches. Further, bead spacers may be used as the spacers 50. The bead spacers may be regularly arranged on the stripe electrode 42, or may be irregularly arranged thereon.

As shown in FIG. 4, the liquid crystal lens panel 30 includes the second substrate 34. On the inner surface of the second substrate 34 that faces the liquid crystal material 33, a second electrode 54 formed of a transparent conductive material such as indium tin oxide (ITO) is formed. The second electrode 54 is arranged to face the plural stripe electrodes 42. On the inner surface of the second substrate 34, the second orientation film 48 is formed to cover the second electrode 54. An angle formed by the rubbing direction of the first orientation film 46 and the rubbing direction of the second orientation film 48 is 90 degrees. On a side of the second substrate 34 opposite to the liquid crystal material 33, the second polarizing plate 36 is disposed. As shown in FIG. 1, the first polarizing plate 22 and the second polarizing plate 36 are arranged in a crossed-Nicol manner.

The liquid crystal lens panel 30 includes the liquid crystal material 33. The liquid crystal material 33 is provided in the cell gap between the first substrate 32 and the second substrate 34. The liquid crystal material 33 is provided in a state where orientation of liquid crystal molecules is twisted, in which polarized light incident through the first polarizing plate 22 is rotated and then passes through the second polarizing plate 36.

Figure 6:
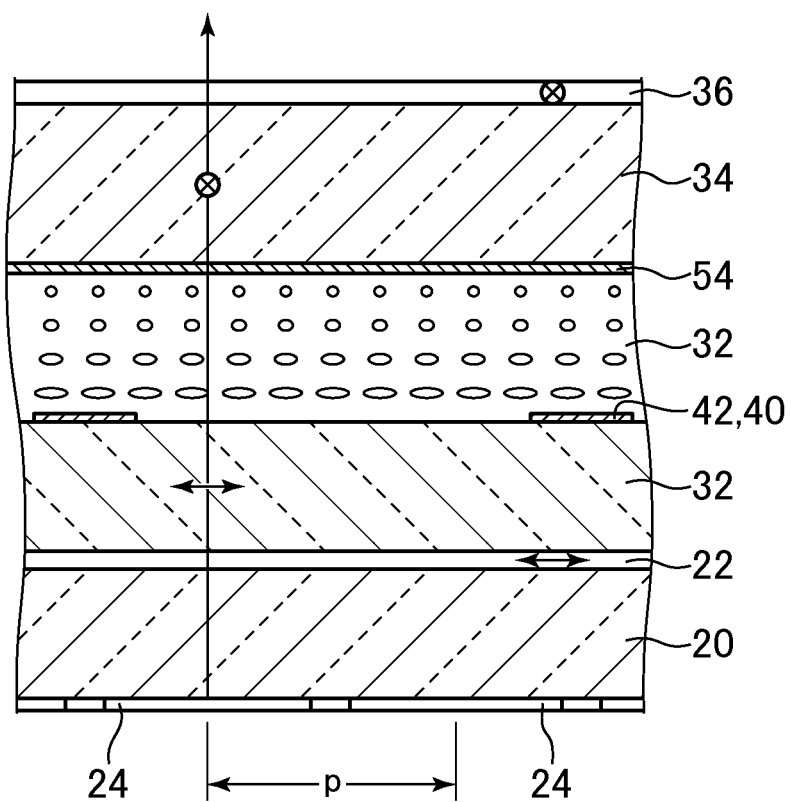
FIG. 6 is a diagram illustrating an operation in a two-dimensional display (in no-voltage application).

FIG. 6 is a diagram illustrating an operation in a two-dimensional display (in no-voltage application). In addition, the adhesive resin 38, the first orientation film 46 and the second orientation film 48 are not illustrated in FIG. 6.

FIG. 6 shows a cross section of the liquid crystal lens panel 30 and the display panel 10. When the two-dimensional display is performed, voltage is not applied between the first electrode 40 and the second electrode 54. When the voltage is not applied, light beams of the linearly polarized light incident onto the liquid crystal material 33 of twisted nematic orientation are rotated by 90 degrees in the polarization direction. The transmission axis of the first polarizing plate 22 and the transmission axis of the second polarizing plate 36 are shifted from each other by an angle of 90 degrees, and the light beams pass though the second polarizing plate 36 with high efficiency. Since the light beams advance while rotating in the polarization direction along the twist of the liquid crystal material 33, the light beams that pass through the second polarizing plate 36 advance while sensing an extraordinary light refractive index of the liquid crystal material 33. Since the liquid crystal material 33 does not act on the advancing of the light beams, the two-dimensional display is achieved. The transmittance of the liquid crystal lens panel 30 is made constant. Here, the light beams that enter the spacers 50 do not pass through the liquid crystal material 33. Thus, the light beams are not changed in the polarization direction and do not pass through the second polarizing plate 36.

Figure 7:
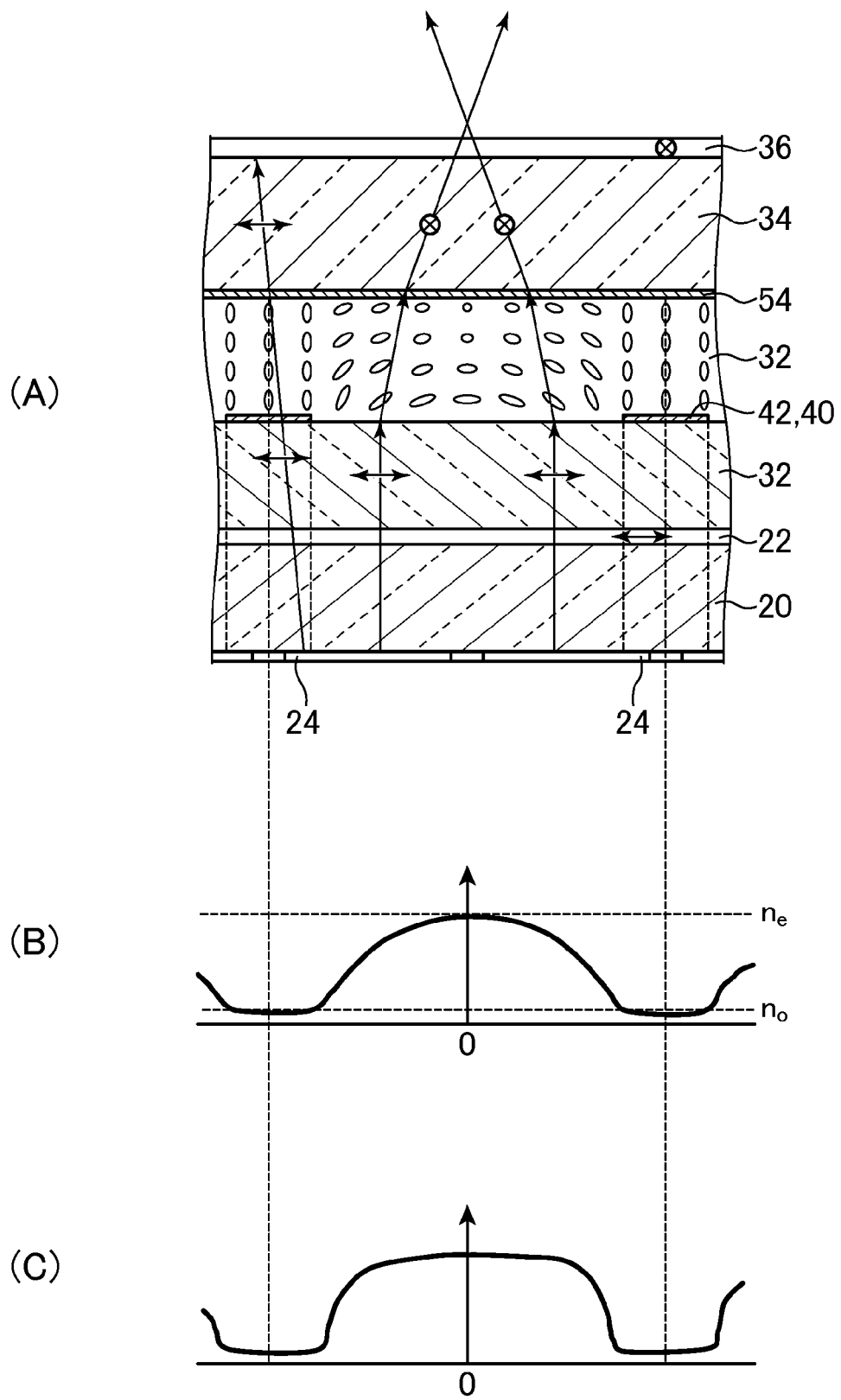
FIG. 7 is a diagram illustrating an operation in a three-dimensional display (in voltage application).

FIG. 7 is a diagram illustrating an operation in the three-dimensional display (in voltage application).

In (A) of FIG. 7, a cross section of the liquid crystal lens panel 30 and the display panel 10 is shown. When the three-dimensional display is performed, an AC drive voltage is applied between the first electrode 40 and the second electrode 54. Orientation distribution occurs in the liquid crystal material 33 by an electric field generated between the first electrode 40 and the second electrode 54. Since the liquid crystal material 33 on the first electrode 40 stands up, an effective refractive index is reduced. At the center of a cylindrical lens, since the liquid crystal orientation is not substantially changed, the effective refractive index is high. Between the center of the cylindrical lens and the first electrode 40, the twist of the liquid crystal material 33 comes untwisted due to an inclined electric field between the first electrode 40 and the second electrode 54, and thus, the effective refractive index is reduced.

The present embodiment may be applied to a multi-viewpoint case, but a two-viewpoint case will be described hereinafter. In the two-viewpoint case, a right-eye pixel 24 and a left-eye pixel 24 are adjacently arranged. The right-eye pixel 24 and the left-eye pixel 24 are separated from each other according to a lens effect due to refractive index distribution of the liquid crystal material 33 for image formation, to thereby obtain the three-dimensional display. A light beam output from the right-eye pixel 24 arranged on the left side in (A) of FIG. 7 is bent in its optical path and is rotated in its polarization direction in the liquid crystal material 33, passes through the second polarizing plate 36, and is condensed at a viewpoint position. Similarly, a light beam output from the left-eye pixel 24 arranged on the right side in (A) of FIG. 7 passes through the liquid crystal material 33 and the second polarizing plate 36, and is condensed at the viewpoint position. Since a light beam that passes through the first electrode 40 is reduced in its polarization rotation angle in the liquid crystal material 33, the light beam is absorbed in the second polarizing plate 36.

In (B) of FIG. 7, the refractive index distribution of the liquid crystal lens panel 30 is shown. The refractive index distribution preferably shows a quadratic function. The refractive index at the center of the cylindrical lens becomes a value close to an extraordinary light refractive index $n_e$ of the liquid crystal material 33, and the refractive index on the first electrode 40 becomes a value close to an ordinary light refractive index $n_o$. Between the adjacent stripe electrodes 42, the refractive index is changed, and thus, the lens effect is obtained. On the stripe electrodes 42 and in the vicinity thereof, the change in the refractive index is small, or does not almost occur.

In (C) of FIG. 7, the transmittance distribution of the liquid crystal lens panel 30 is shown. Since light that passes on the stripe electrodes 42 and in the vicinity thereof is absorbed in the second polarizing plate 36, areas above the stripe electrodes 42 and in the vicinity thereof become dark. Accordingly, it is possible to absorb and reduce a crosstalk component generated in the vicinity of the stripe electrode 42 by the second polarizing plate 36. Even though the width of the stripe electrodes 42 is increased, it is possible to reduce the crosstalk. Further, since the light shielded areas are generated, it is possible to reduce the crosstalk by obtaining the three-dimensional effect due to light-shielding, similar to the three-dimensional effect of the barrier type. The spacers 50 viewed dark are provided on the stripe electrodes 42, and thus, are not easily viewed in the three-dimensional display.

The liquid crystal material 33 is driven in a twisted nematic manner by a voltage (AC drive voltage) applied between the plural stripe electrodes 42 and the second electrode 54. If the voltage is applied, the liquid crystal molecules lose rotary power in a direction along an electric field on each of the stripe electrodes 42, but form a refractive index distribution of a lenticular lens in a region between the adjacent stripe electrodes 42. The lenticular lens is formed to have a cylindrical lens where a cylindrical axis is arranged in the first direction. The cylindrical lens faces at least two rows of pixels 24 of the display panel 10. The cylindrical lens has an effective refractive index for emitting light from the at least two rows of pixels 24 facing each other through the second polarizing plate 36 and then causing the light to advance in separating directions from each other.

According to the present embodiment, if the liquid crystal lens panel 30 is not driven, since the polarized light that is incident onto the liquid crystal material 33 through the first polarizing plate 22 rotates in the liquid crystal material 33 and passes through the second polarizing plate 36, the two-dimensional display is achievable. In the three-dimensional display, since the liquid crystal molecules lose rotary power on the stripe electrodes 42, the light becomes dark without passage on the stripe electrode 42. Thus, even though the width of the stripe electrodes 42 is increased, it is possible to reduce a crosstalk component. Since it is possible to increase the width of the stripe electrodes 42, it is possible to reduce an interval s between the adjacent stripe electrodes 42. Thus, it is possible to reduce the width of the cylindrical lens, and also to reduce the height, thereby reducing the cell gap. As the cell gap is reduced, it is possible to achieve a quick response of the liquid crystal lens panel 30.

Figure 8:
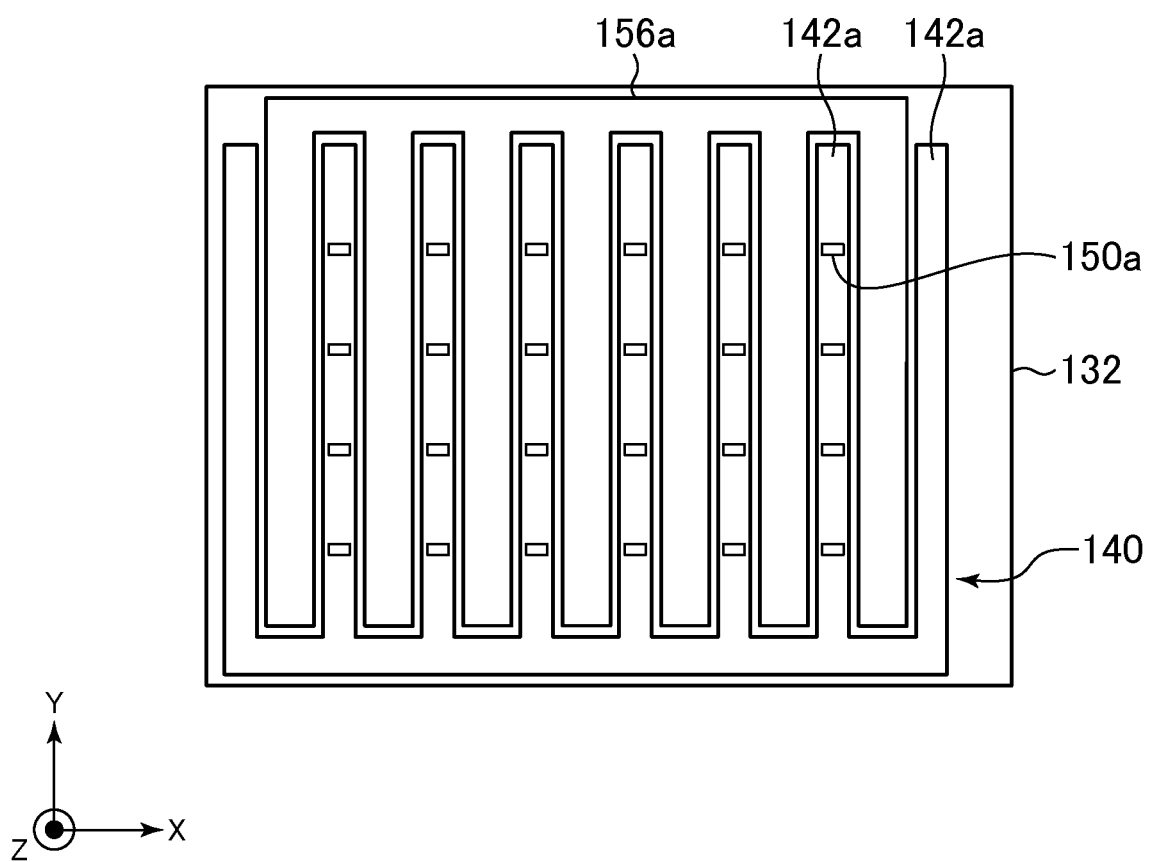
FIG. 8 is a plan view illustrating a first substrate according to a modification example.
Figure 9:
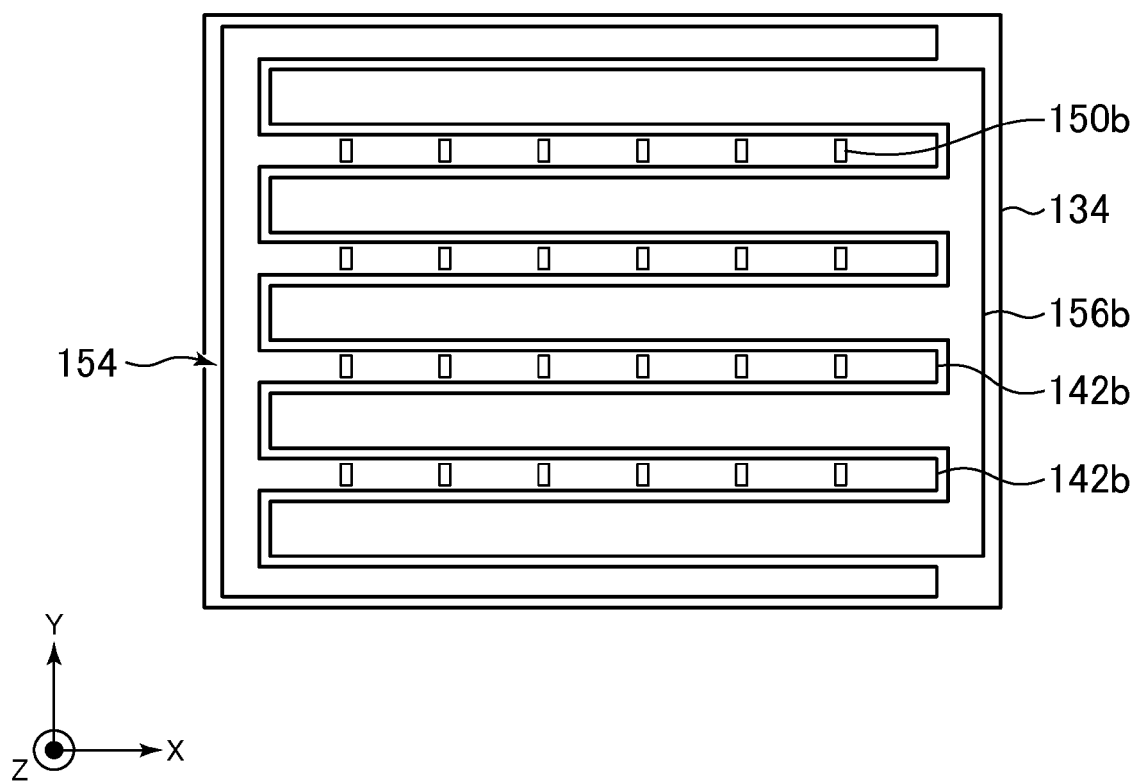
FIG. 9 is a plan view illustrating a second substrate according to a modification example.

FIG. 8 is a plan view illustrating a first substrate according to a modification example. FIG. 9 is a plan view illustrating a second substrate according to a modification example.

A first electrode 140 of a first substrate 132 shown in FIG. 8 includes plural first stripe electrodes 142a. A first auxiliary electrode 156a is provided between the adjacent first stripe electrodes 142a. A first spacer 150a is formed on each of the first stripe electrodes 142a. A cross section of the first spacer 150a is a rectangular shape, in which short sides are approximately parallel to the first stripe electrode 142a. With such a shape, if rubbing is performed intersecting with (for example, perpendicular to) the short sides having a narrow width, the width of an area where a rubbing error occurs due to the first spacer 150a is narrowed.

A second electrode 154 of a second substrate 134 shown in FIG. 9 includes plural second stripe electrodes 142b. A second auxiliary electrode 156b is provided between the adjacent second stripe electrodes 142b. A second spacer 150b is formed on each of the second stripe electrodes 142b. A cross section of the second spacer 150b is a rectangular shape, in which the first spacer 150a is rotated by 90 degrees. With such a shape, if rubbing is performed intersecting with (for example, perpendicular to) short sides having a narrow width, the width of an area where a rubbing error occurs due to the second spacer 150b is narrowed.

The first spacer 150a and the second spacer 150b are provided so as not to be protruded from both of the first stripe electrode 142a and the second stripe electrode 142b. Since the first spacer 150a and the second spacer 150b are dividedly provided in the first substrate 132 and the second substrate 134, respectively, it is possible to increase the aspect ratio, compared with a case where the first spacer 150a and the second spacer 150b are integrally provided. If the aspect ratios are the same, it is possible to reduce an installation area of the first spacer 150a and the second spacer 150b. Since each of the first spacer 150a and the second spacer 150b has a height corresponding to ½ of the total height of the both spacers, it is possible to reduce each installation area to ¼ to the minimum. Since the installation area and volume are reduced, light scattering is decreased, and thus, it is possible to achieve the effect that the first spacer 150a and the second spacer 150b are not easily viewed. With the reduced height, the first spacer 150a and the second spacer 150b are easily formed.

Figure 10:
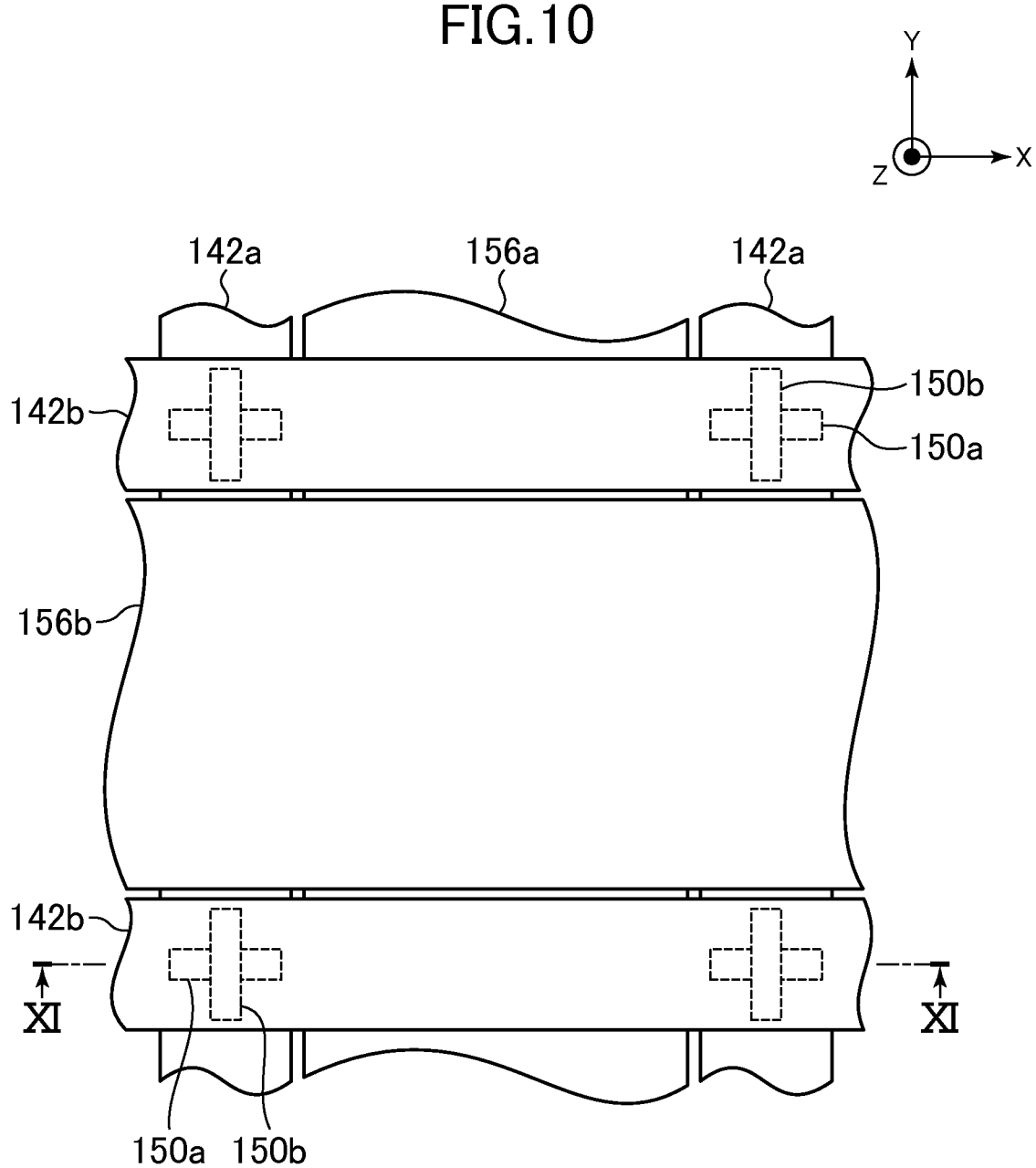
FIG. 10 is a plan view illustrating an arrangement of a first stripe electrode and a second stripe electrode, and a first spacer and a second spacer.

FIG. 10 is a plan view illustrating arrangement of the first stripe electrodes 142a and the second stripe electrodes 142b, and the first spacers 150a and the second spacers 150b. FIG. 11 is a cross-sectional view, taken along line XI-XI, illustrating the structure shown in FIG. 10.

When the second substrate 134 is bonded to the first substrate 132, the first spacer 150a and the second spacer 150b overlap each other to maintain the cell gap. The first spacer 150a and the second spacer 150b overlap each other in a cross shape, and thus, a position shift is allowed to some extent. Thus, it is possible to moderate the overlap accuracy of the first substrate 132 and the second substrate 134. The first spacer 150a and the second spacer 150b preferably extend to be perpendicular to the lengths of the first stripe electrode 142a and the second stripe electrode 142b, respectively.

When the first stripe electrode 142a is operated to form a cylindrical lens arranged in the X direction, an alternating voltage is applied between the second stripe electrode 142b, the second auxiliary electrode 156b and the first auxiliary electrode 156a, and the first stripe electrode 142a, using the second stripe electrode 142b, the second auxiliary electrode 156b and the first auxiliary electrode 156a as a common electric potential.

When the second stripe electrode 142b is operated to form a cylindrical lines parallel to the Y direction, an alternating voltage is applied between the first stripe electrode 142a, the second auxiliary electrode 156b and the first auxiliary electrode 156a, and the second stripe electrode 142b, using the first stripe electrode 142a, the second auxiliary electrode 156b and the first auxiliary electrode 156a as a common electric potential.

Figure 12:
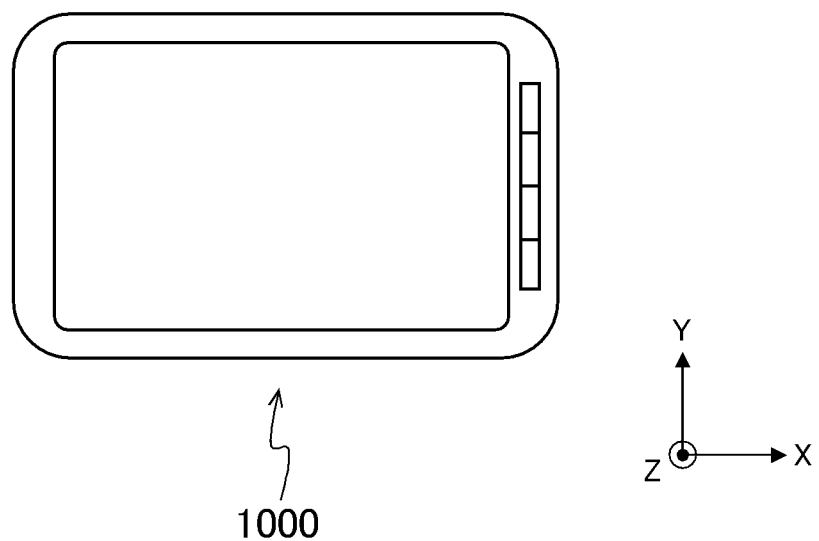
FIG. 12 is a diagram illustrating an electronic apparatus that includes the display device according to the embodiment of the invention.

FIG. 12 is a diagram illustrating an electronic apparatus that includes the display device according to the embodiment of the invention. In this example, an electronic apparatus 1000 is a personal digital assistant, in which the three-dimensional display is performed in a horizontal arrangement.

Figure 13:
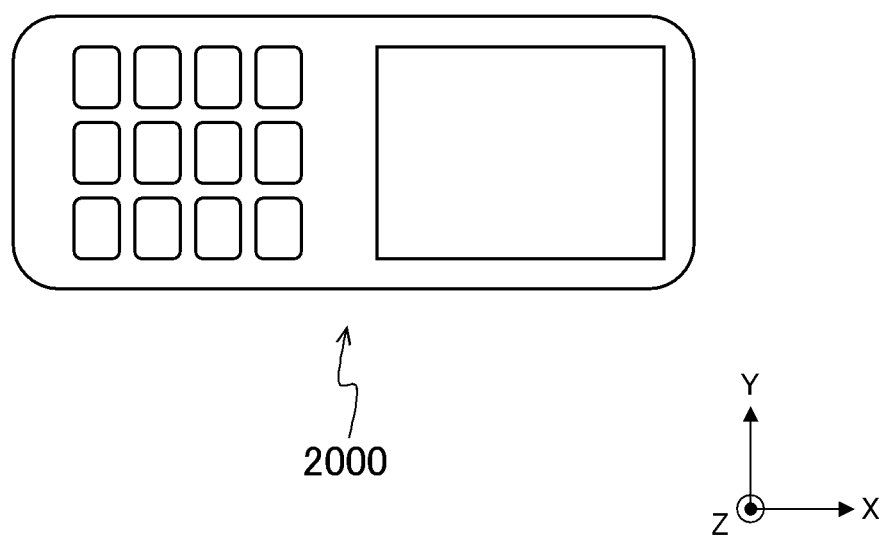
FIG. 13 is a diagram illustrating an electronic apparatus that includes a display device according to a modification example.
Figure 14:
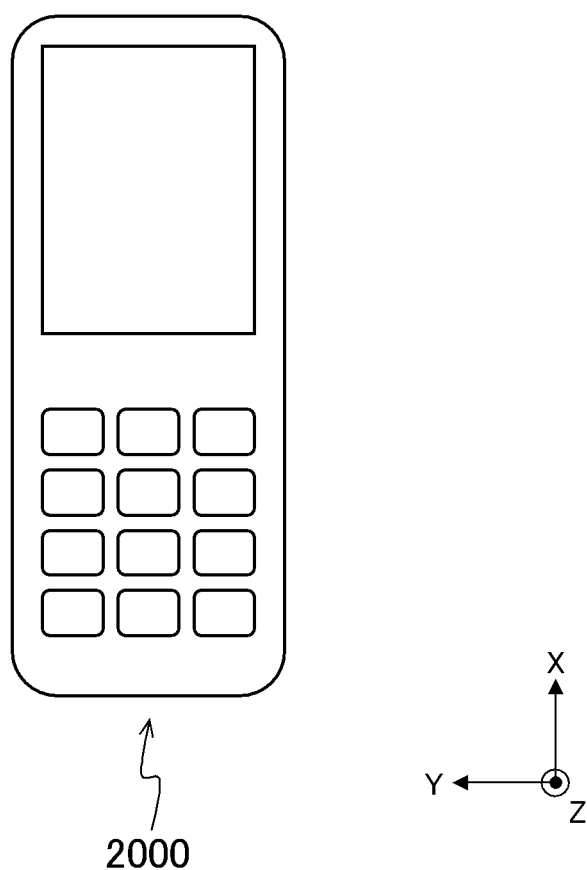
FIG. 14 is a diagram illustrating an electronic apparatus that includes a display device according to a modification example.

FIGS. 13 and 14 are diagrams illustrating an electronic apparatus that includes a display device according to the modification example. In this example, an electronic apparatus 2000 is a mobile phone, in which the three-dimensional display can be performed in any arrangement of a vertical arrangement shown in FIG. 13 and a horizontal arrangement shown in FIG. 14, using a liquid crystal lens panel capable of switching of vertical and horizontal displays.

While there have been described what are at present considered to be certain embodiments of the invention, it is understood that various modifications may be made thereto, and it is intended that the appended claims cover all such modifications to fall within the true spirit and scope of the invention.

Working Example

Next, the relation of a distance d of the cell gap and the interval s of the adjacent stripe electrodes 42 will be described with reference to FIG. 4. The inventors found that in the configuration of the liquid crystal lens panel 30 shown in this example, to obtain an ideal refractive index distribution, an optimal range for s/d is present. The range is preferably $3.5 \leq s/d \leq 7$, and more preferably $4.5 < s/d < 5.5$.

This range was calculated by calculating s/d with respect to crosstalk by simulation. The simulation was performed by calculating s/d by light beam tracing software using a calculation result of liquid crystal orientation. In the calculation, the pitch p (FIG. 2 or FIG. 6) of the pixels 24 was set to 80 μm.

Figure 15:
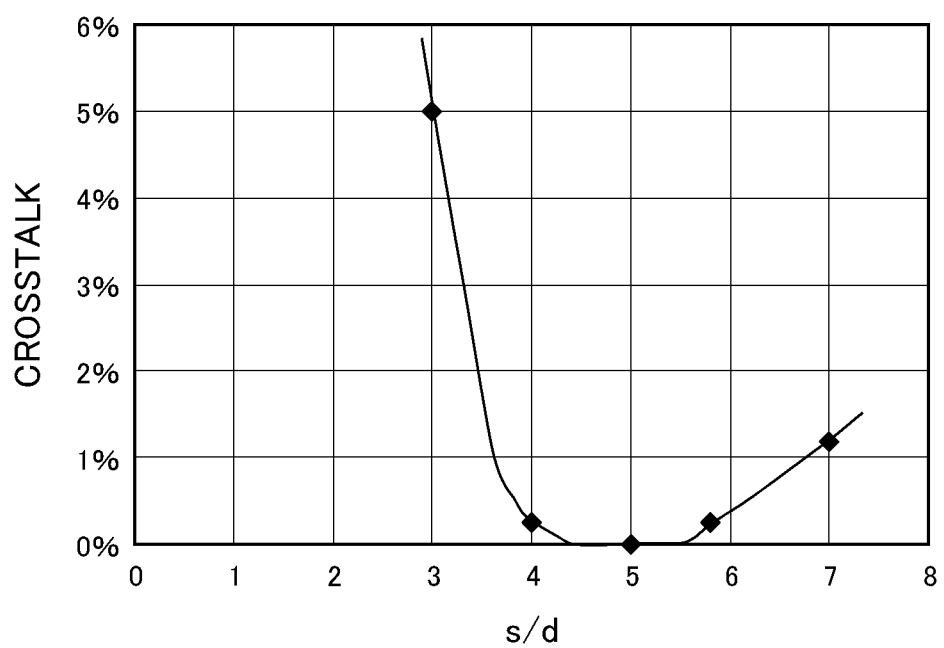
FIG. 15 is a graph illustrating a simulation result.

FIG. 15 is a graph illustrating a simulation result. Since if crosstalk is 1% or lower, it is difficult for a human to recognize the crosstalk, it can be understood that $3.5 \leq s/d \leq 7$ is preferable for reduction of the crosstalk. Further, in $4.5 < s/d < 5.5$, the crosstalk becomes approximately zero, which is more preferable.

In the present example, it is possible to increase the width of the stripe electrodes 42, and thus, it is possible to reduce s, to thus reduce the cell gap d without degrading the quality of the three-dimensional display. By reducing the cell gap d, it is possible to reduce a response time of the liquid crystal lens panel 30, to thereby easily manufacture the liquid crystal lens panel 30, which enhances reliability.

When q is a liquid crystal lens pitch, p is the pitch of the pixels 24 (FIG. 2 or FIG. 6), and E is an interocular distance (about 65 mm in an average adult) (not shown), q=2p/(1+p/E). Thus, for example, when the pitch p of the pixels 24 is 80 μm, the liquid crystal lens pitch q is about 160 μm. Here, in a liquid crystal lens panel in the related art, the width of stripe electrode is 10 μm (s=150 μm) and a cell gap is 30 μm to obtain an excellent characteristic. In this example, since crosstalk is not increased even though the width of the stripe electrodes 42 is increased, if s/d is the same as in the related art, it is possible to set the cell gap to 26 μm when the width of the stripe electrodes 42 is 30 μm (s=130 μm), and it is possible to set the cell gap to 22 μm when the width of the stripe electrodes 42 is 50 μm (s=110 μm). Since the response time is generally proportional to a square of the cell gap, it is possible to reduce the response time to 75% and 54%, respectively, compared with the related art.

When the refractive index distribution having the shape of the ideal quadratic function is obtained, if the cell gap is determined so as to satisfy the following expression (1), it is possible to reduce crosstalk, and to enlarge a three-dimensional display area.

$$d = n_1 s^2 / 8\Delta n G \quad (1)$$

Here, d represents the cell gap of the liquid crystal lens, $n_1$ represents the refractive index (for example, 1.5 in a glass substrate) of the first substrate 32, $\Delta n$ represents refractive index anisotropy of the liquid crystal material 33, G represents a gap between the pixels 24 and the liquid crystal material 33 (see FIG. 1), and s (=q−1) represents the interval between the adjacent stripe electrodes 42.

Further, between the gap G between the pixels 24 and the liquid crystal material 33, and an optimal viewpoint distance D (not shown), the relation of expression (2) is established.

$$G = n_1 p D / E \quad (2)$$

Here, p represents the pitch of the pixels 24, and E represents the interocular distance (about 65 mm in an average adult). From the expression (1), the following expression is obtained.

$$s/d = 8\Delta n G / n_1 s$$

Accordingly, to make s/d constant while reducing s, it is necessary to reduce the refractive index anisotropy $\Delta n$ of the liquid crystal material 33 or the gap G. From the expression (2), to reduce G, it is necessary to reduce the optimal viewpoint distance D or the pitch p of the pixels 24.

As described above, it can be understood that it is possible to use the liquid crystal material 33 having a small refractive index anisotropy $\Delta n$ by making s/d constant and reducing s. For example, in the liquid crystal lens panel 30 in the related art, if the liquid crystal lens pitch is about 160 μm, the width of the stripe electrodes 42 is 10 μm (s=150 μm), and the cell gap is 30 μm, the refractive index anisotropy $\Delta n$ of the liquid crystal material 33 is 0.2. On the other hand, in this example, if the width of the stripe electrodes 42 is 30 μm (s=130 μm), it is possible to use the liquid crystal material 33 of $\Delta n$=0.17, and if the width of the stripe electrodes 42 is 50 μm (s=110 μm), it is possible to use the liquid crystal material 33 of $\Delta n$=0.15. Since the refractive index anisotropy $\Delta n$ is small, the liquid crystal material 33 has high reliability.

Further, since it is possible to reduce the gap G between the pixels 24 and the liquid crystal material 33, it is possible to reduce the optimal viewpoint distance D without degrading the quality of the three-dimensional display. The present embodiment may also be applied to the high-accuracy display panel 10 with a small pitch of the pixels 24 without degrading the quality of the three-dimensional display.

What is claimed is:

1. A display device comprising:
   a display panel that displays an image formed by a plurality of pixels;
   a liquid crystal lens panel for a naked-eye stereoscopic view; and
   a plurality of spacers, wherein
   the liquid crystal lens panel includes a first substrate, a second substrate, a liquid crystal material disposed in a cell gap between the first substrate and the second substrate, a first electrode formed on a first inner surface of the first substrate that faces the liquid crystal material, a second electrode formed on a second inner surface of the second substrate that faces the liquid crystal material, a first polarizing plate arranged on a side of the first substrate opposite to the liquid crystal material, and a second polarizing plate arranged on a side of the second substrate opposite to the liquid crystal material,
   the first polarizing plate and the second polarizing plate are arranged in a crossed-Nicol manner,
   the liquid crystal material is arranged in a state where orientation of liquid crystal molecules is twisted so that incident light that passes through the first polarizing plate and is polarized passes through the second polarizing plate while being rotated,
   one of the first electrode and the second electrode includes a plurality of stripe electrodes that extend in a first direction and are arranged at intervals in a second direction intersecting with the first direction so that the adjacent stripe electrodes are arranged in parallel,
   the other one of the first electrode and the second electrode is arranged to face the plurality of stripe electrodes,
   the liquid crystal material is driven in a twisted nematic mode in which while the liquid crystal molecules lose, on each of the stripe electrodes, rotary power toward a direction along an electric field by a voltage applied between the plurality of stripe electrodes and the second electrode,
   the plurality of pixels are arranged in a plurality of rows so that each row extends along the first direction, and
   the plurality of spacers are arranged on the plurality of stripe electrodes to maintain the cell gap.

2. The display device according to claim 1, wherein the plurality of spacers are arranged so as not to be protruded on the plurality of stripe electrodes.

3. The display device according to claim 2, wherein a distance d of the cell gap and an interval s between the adjacent stripe electrodes satisfy the relation of 3.5≤s/d≤7.

4. The display device according to claim 3, wherein a pitch $P_2$ of the adjacent spacers in the second direction and a pitch Q of the adjacent stripe electrodes satisfy the relation of $P_2$=nQ (n is a natural number).

5. The display device according to claim 4, wherein a pitch $P_1$ of the adjacent spacers in the first direction and the pitch Q of the adjacent stripe electrodes satisfy the relation of $P_1$=mQ (m is a natural number).

6. The display device according to claim 1, wherein the liquid crystal lens panel further includes a first orientation film formed on the first inner surface of the first substrate to cover the first electrode, and a second orientation film formed on the second inner surface of the second substrate to cover the second electrode.

7. The display device according to claim 6, wherein an angle formed by a rubbing direction of the first orientation film and a rubbing direction of the second orientation film is 90 degrees.

8. The display device according to claim 6, wherein a permissible value of a transmission axis of the first polarizing plate is 80 to 90 degrees, and the rubbing direction of the first orientation film is 80 to 90 degrees with respect to the first direction.

9. The display device according to claim 1, wherein the width of each of the stripe electrodes is wider than the thickness of the liquid crystal material.

10. The display device according to claim 1, wherein the plurality of stripe electrodes are a plurality of first stripe electrodes included in the first electrode,
    the second electrode includes a plurality of second stripe electrodes,
    each of the spacers includes a first spacer and a second spacer that are arranged to be overlapped,
    the first spacer is arranged on the first stripe electrode, the second spacer is arranged on the second stripe electrode, a cross section of the first spacer is a rectangular shape, in which short sides thereof are parallel to the first stripe electrode, a cross section of the second spacer is a rectangular shape, which is a shape obtained by rotating the first spacer by 90 degrees, and the first spacer and the second spacer overlap each other in a cross shape.

11. The display device according to claim 10, further comprising:

a first auxiliary electrode provided between the adjacent first stripe electrodes, and a second auxiliary electrode provided between the adjacent second stripe electrodes.

* * * * *